(12) United States Patent
Maruta

(10) Patent No.: US 9,083,554 B2
(45) Date of Patent: Jul. 14, 2015

(54) APPARATUS FOR PROVIDING CONNECTION BETWEEN NETWORKS

(75) Inventor: Satoshi Maruta, Kodaira (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 995 days.

(21) Appl. No.: 13/202,812

(22) PCT Filed: Nov. 19, 2009

(86) PCT No.: PCT/JP2009/069651
§ 371 (c)(1),
(2), (4) Date: Aug. 23, 2011

(87) PCT Pub. No.: WO2010/095324
PCT Pub. Date: Aug. 26, 2010

(65) Prior Publication Data
US 2011/0299538 A1 Dec. 8, 2011

(30) Foreign Application Priority Data

Feb. 23, 2009 (JP) .................................. 2009-039720

(51) Int. Cl.
*H04L 12/56* (2006.01)
*H04L 12/46* (2006.01)

(52) U.S. Cl.
CPC ........ *H04L 12/4641* (2013.01); *H04L 12/4625* (2013.01)

(58) Field of Classification Search
CPC ...................... H04L 61/2514; H04L 29/12367
See application file for complete search history.

(56) References Cited

U.S. PATENT DOCUMENTS

| | | | |
|---|---|---|---|
| 6,674,756 B1 * | 1/2004 | Rao et al. | 370/395.21 |
| 7,406,526 B2 * | 7/2008 | Benchetrit et al. | 709/228 |
| 2003/0185207 A1 * | 10/2003 | Nakahara | 370/389 |
| 2004/0003292 A1 | 1/2004 | Kato | |
| 2005/0220100 A1 | 10/2005 | Kawabe | |
| 2007/0118594 A1 | 5/2007 | Takeda et al. | |

FOREIGN PATENT DOCUMENTS

| | | |
|---|---|---|
| JP | H11313073 | 11/1999 |
| JP | WO2004/051936 A1 | 6/2004 |
| JP | 2005-294915 A1 | 10/2005 |
| JP | 2005294915 | 10/2005 |
| JP | 2007116441 | 5/2007 |

OTHER PUBLICATIONS

Office Action dated Apr. 9, 2013 issued in corresponding Japanese application No. 2009-039720.

* cited by examiner

*Primary Examiner* — Khaled Kassim
*Assistant Examiner* — Zhaohui Yang
(74) *Attorney, Agent, or Firm* — Bacon & Thomas, PLLC

(57) ABSTRACT

When an internal terminal (TM1 to TMn) replaced with another terminal due to the breakdown or the model upgrading and the DHCP function allocates a new private address for the MAC address of the terminal after replacement, the newly allocated private address is managed in association with physical ports (PP1 to PPn) in an expansion NAPT table. Then, in this state, when an IP packet is delivered from an external terminal (TM0) on the side of a WAN(2), the transmission destination address of this IP packet is converted to the private address of the internal terminal after conversion in accordance with the expansion NAPT table using the physical ports as a key.

6 Claims, 14 Drawing Sheets

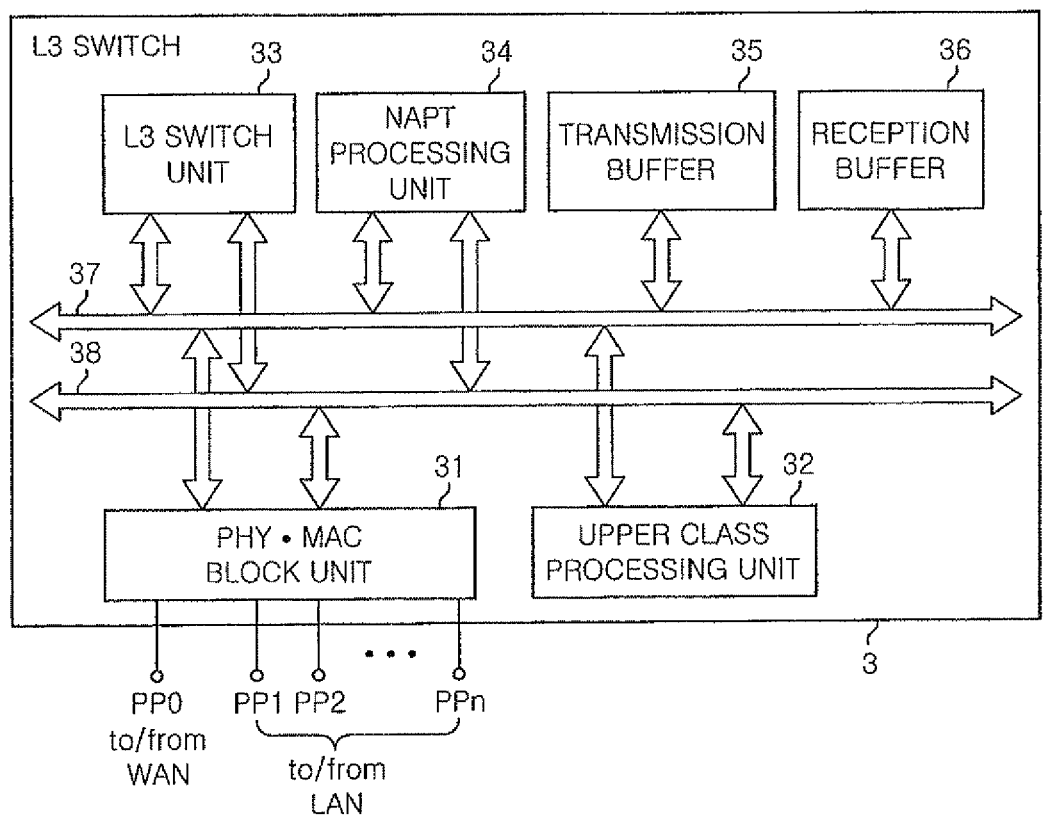

FIG. 4

| IP ADDRESS: PORT NUMBER (NAPT SIDE) | IP ADDRESS: PORT NUMBER (MACHINE AT WAN SIDE) | PHYSICAL PORT | RECEPTION MAC ADDRESS | IP ADDRESS: PORT NUMBER (MACHINE AT LAN SIDE) | PHYSICAL PORT | RECEPTION MAC ADDRESS |
|---|---|---|---|---|---|---|
| 10.1.101.150:80 | 10.1.101.200:5000 | PP0 | MAg | 192.168.1.90:80 | PP1 | MA1 |
| 10.1.101.150:81 | 10.1.101.200:5000 | PP0 | MAg | 192.168.1.180:80 | PP2 | MA2 |
| ... | ... | ... | ... | ... | ... | ... |
| 10.1.101.150:87 | 10.1.101.200:5000 | PP0 | MAg | 192.168.1.200:80 | PP7 | MA8 |
| 10.1.101.150:8554 | 0.0.0.0:0 | PP0 | MAg | 0.0.0.0:554 | PP1 | MA1 |
| 10.1.101.150:8555 | 0.0.0.0:554 | PP0 | MAg | 192.168.1.180:554 | – | MA2 |

FIG. 5

| PHYSICAL PORT | NOMINAL IP ADDRESS OF TERMINAL | ACTUAL IP ADDRESS OF TERMINAL | VIRTUAL PORT |
|---|---|---|---|
| PP1 | 192.168.1.1 | 192.168.1.90 | VP1 |
| PP2 | 192.168.1.2 | 192.168.1.180 | VP1 |
| ⋮ | ⋮ | ⋮ | ⋮ |
| PP7 | 192.168.1.7 | 192.168.1.200 | VP1 |
| PPx | RANDOM (192.168.1.0/24) | RANDOM (192.168.1.0/24) | VP1 |

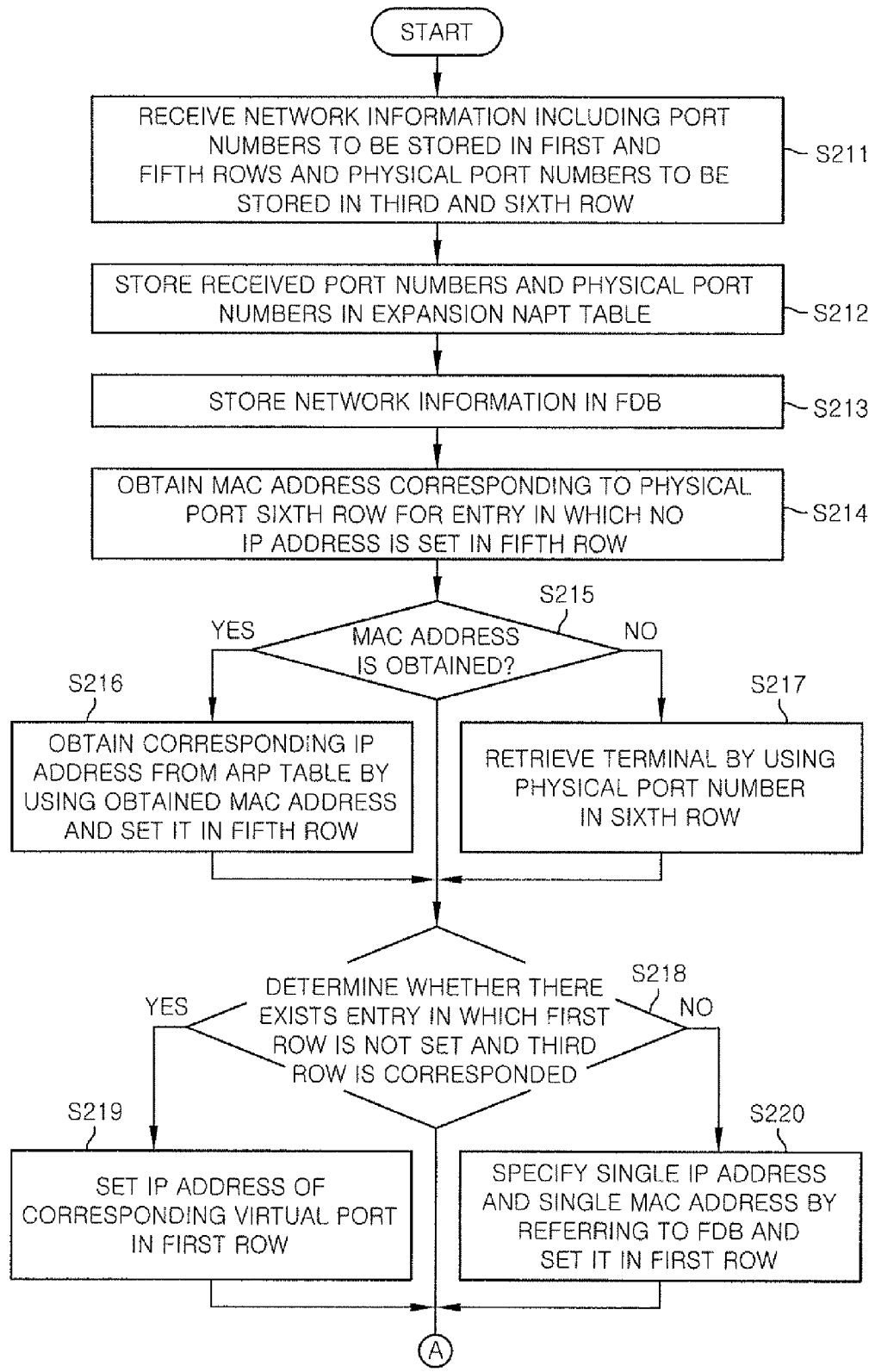

APPARATUS FOR PROVIDING CONNECTION BETWEEN NETWORKS

FIELD OF THE INVENTION

The present invention relates to an apparatus for providing connection between networks which is used for connecting a plurality of networks such as a LAN (Local Area Network), a WAN (Wide Area Network) and the like.

BACKGROUND OF THE INVENTION

Generally, a private address is used in a LAN for home and office. Meanwhile, a global address is used in a WAN for the Internet. Therefore, it is not possible to directly access the Internet from a node of a home network or an office network. Accordingly, an apparatus for providing connection between networks which is referred to as a router, a switch, a gateway or the like is installed between the LAN and the WAN. The apparatus for providing connection between networks has an address translation function referred to as NAT (Network Address Translation) or IP masquerade. The NAT allows one-on-one translation between a private address allocated to an inner node of the LAN and a global address allocated to an external node of the WAN. The NAT is used when the LAN has a single internal node. Meanwhile, the IP masquerade allows a plurality of private addresses to be used by a single global address. The IP masquerade translates a port number and a private address of the LAN to a port number and a global address of the WAN (see, e.g., Patent Document 1).

FIG. 12 shows an example of an access operation between terminals in the case of using a router as an apparatus for providing connection between networks.

Referring to FIG. 12, a router 30 includes a single WAN port PP0 and a plurality of LAN physical ports PP1 to PPn. An external terminal TM10 is connected to the WAN port PP0 through a WAN 2. Meanwhile, internal terminals TM11 to TM1n are respectively connected to the LAN physical ports PP1 to PPn through a LAN 1. A global address (10.1.101.150) is allocated to the WAN port PP0, and a global address (10.1.101.200) is allocated to the external terminal TM10. Further, private addresses (192.168.1.1), (192.168.1.2) . . . (192.168.1.n) are respectively allocated to the internal terminals TM11 to TM1n.

For example, when the internal terminal TM11 connected to the LAN 1 needs to access the external terminal TM10, the internal terminal TM11 generates, in step S41, an IP packet in which a transmission destination port number 80 and the global address (10.1.101.200) of the external terminal TM10 are set as a transmission destination address and a transmission source port number 3000 and the private address (192.168.1.1) of the internal terminal TM11 are set as a transmission source address and transmits the generated IP packet to the router 30.

In step S42, the router 30 that has received the IP packet converts the private address (192.168.1.1) set as the transmission source address of the IP packet to the global address (10.1.101.150) of the WAN port PP0 and the transmission source port number 3000 to a port number 8000 dynamically allocated by the router 30. Next, in step S43, the IP packet whose transmission source address has been converted is transmitted from the WAN port PP0 to the external terminal TM10 through the WAN 2. In order to prepare for the return of the IP packet from the external terminal TM10, the router 30 dynamically stores in an address conversion table the transmission source addresses after conversion in correspondence with the transmission source address before conversion.

In case that the external terminal TM10 returns the IP packet, the external terminal TM10 that has received the IP packet generates a new IP packet in which the transmission source port number 8000 and the transmission source address (the global address (10.1.101.150)) of the received IP packet are set as a transmission destination address and the transmission destination port number 80 and the global address (10.1.101.200) of the external terminal TM1 are set as a transmission source address and transmits the new IP packet to the router 30.

Upon receiving the new IP packet from the external terminal TM10, the router 30 refers to the address conversion table and converts the transmission destination address of the received IP packet to the port number 3000 and the private address (192.168.1.1) of the internal terminal TM11. Then, the IP packet is transmitted from the physical port PP1 to the internal terminal TM11 through the LAN 1.

In case that another internal terminal TM12 accesses the external terminal TM10, the steps S44 to S46 are carried out similarly to the case that the internal terminal TM11 accesses the external terminal TM10.

Meanwhile, when the WAN external terminal TM10 accesses the internal terminals TM11 to TM1n, the following steps are carried out. FIG. 13 shows an example of the access sequence.

For example, when the external TM10 accesses the internal terminal TM11, the external terminal TM10 generates, in step S51, an IP packet in which a port number 5000 and the global address (10.1.101.200) allocated to the external terminal TM10 are set as a transmission source IP address and the port number 80 and the global address (10.1.101.150) allocated to the WAN port PP0 are set as a transmission destination address and transmits the IP packet to the router 30 through the WAN 2.

The router 30 includes the address conversion table that has been created statically in advance. In step S52, the router 30 that has received the IP packet from the external terminal TM10 retrieves the address conversion table by using as a key the transmission destination port number 80 set in the IP packet. As a result of the retrieval, the router 30 converts the port number 80 and the transmission destination global address (10.1.101.150) to the port number 80 and the private address (192.168.1.1) of the internal terminal TM11. In step S53, the router 30 transmits to the internal terminal TM11 through the LAN 1 the IP packet whose transmission destination address has been converted from the LAN physical port PP1.

When the external terminal TM10 transmits the IP packet to one of other internal terminals TM12 to TM1n, the router 30 performs the steps of: retrieving the address conversion table by using the transmission destination port number of the IP packet as a key; converting the transmission destination address; and transmitting the IP packet (e.g., steps S54 to S56) similarly to the case that the external terminal TM10 accesses the internal terminal TM11.

Patent Document 1: Japanese Patent Application Publication No. 2007-116441

However, as described above, in order to allow the WAN external terminal TM10 to access the LAN internal terminals TM11 to TM1n, the router 30 needs to create the address conversion table and statically store in the address conversion table the information on the correspondence relationship between the global addresses of the WAN ports and the private addresses of the internal terminals TM11 to TM1n.

Therefore, it becomes a significant burden to manage the address conversion table when the router 30 is managed.

In the case of using the static address conversion table, the following problems may be generated. Generally, the apparatus for providing connection between networks, such as a router or the like, has a function of dynamically allocating network information such as a private address, a subnet mask or the like to each node by using a DHCP (Dynamic Host Configuration Protocol) in order to manage private addresses of the LAN nodes. Due to the dynamic address allocation function using the DHCP, when the inner terminal TM11 that has been separated from the LAN is reconnected to the LAN, a new private address (192.168.1.90) is allocated to the inner terminal TM11 after reconnection (e.g., step S64 of FIG. 14). Accordingly, the private address of the inner terminal TM11 after reconnection may not correspond to table data set in the address conversion table and, thus, the address conversion may not be executed. For that reason, an operator of the router 30 needs to reconfigure the conversion table in accordance with the private address after reconnection (e.g., step S63 of FIG. 14).

Therefore, there has been suggested a router having a function of registering the corresponding private addresses in correspondence with MAC (Media Access Control) addresses of the internal terminals TM11 to TM1n whenever new private addresses are allocated to internal terminals by the DHCP.

For example, as shown in FIG. 14, when the internal terminal TM11 that has been separated from the router 30 is reconnected to the router 30, the private address (192.168.1.1) registered in the address conversion table in correspondence with the MAC address (00-02-05-01-03-4e) of the internal terminal TM11 is reallocated to the internal terminal TM11 in step S65.

Thus, even when the IP packet is transmitted from the external terminal TM10 to the internal terminal TM11, the transmission destination address is converted to the private address (192.168.1.1) after reallocation in step S62. As a consequence, the IP packet is reliably transmitted to the internal terminal TM11. Further, the operator of the router 30 does not need to reconfigure the private address in the address conversion table whenever the internal terminal is reconnected thereto.

However, the following problems are generated in spite of the above-described solution. Specifically, when an internal terminal is replaced with another terminal due to the breakdown generated during the operation of the internal terminal or the model upgrading of the internal terminal, the MAC address of the terminal after such replacement is changed. Therefore, the operator of the router needs to update network information such as the MAC address, the private address or the like whenever the replacement occurs.

In view of the above, the present invention provides an apparatus for providing connection between networks which can properly manage network information despite replacement of internal nodes and perform a highly reliable routing process while reducing management burden.

SUMMARY OF THE INVENTION

In accordance with an aspect of the present invention, there is provided an apparatus for providing connection between networks which transmits an IF packet between a first network to which a first node is connected and a second network to which a second node is connected by using a private address and a port number allocated to the first node and a global address allocated to the second node and the apparatus.

The apparatus includes an address management table for storing the private address and the port number allocated to the first node in association with a number of a physical port of the apparatus which is connected to the first node.

When the IP packet transmitted from the second node is received, the IF address having a transmission destination global address and a transmission destination port number as transmission destination address information, a physical port number corresponding to the transmission destination port number is retrieved from the address management table based on the transmission destination port number of the IP packet, and the private address allocated to the first node connected to the physical port is retrieved from the address management table based on the physical port number retrieved by the first retrieval unit. Then, transmission destination global address and the transmission destination port number of the IP packet received by the reception unit are overwritten with the retrieved private address and a destination port number retrieved therewith. The IP packet overwritten with the transmission destination address information is transmitted to the first node through the first network.

The apparatus of the aspect of the present invention further includes units for the following functions. Specifically, when the IP packet transmitted from the second node is received, the IP packet having a private address and a transmission destination port number preset for transmission in the first network as transmission destination address information, the physical port number corresponding to the transmission destination port number from the address management table is retrieved based on the transmission destination port number of the IP packet, and the private address allocated to the first node is retrieved from the address management table based on the physical port number retrieved by the first retrieval unit. Then, the private address and the transmission destination port number of the IP packet received by the reception unit are overwritten with the retrieved private address and the retrieved transmission destination port number, and the IP packet overwritten with the transmission destination address information is transmitted to the first node via the first network.

Therefore, when the first node is replaced with another node due to the breakdown of the first node or the model upgrading and the DROP function allocates a new private address for the node after replacement, the newly allocated private address is managed in association with the physical ports connected to the node in the address management table. Then, in this state, when the IP packet is delivered from the second node, transmission destination address information of the IP packet is converted to a private address of the first node after the conversion performed by using the physical ports as a key in accordance with the address management table.

Accordingly, even when the first node is replaced with another node due to the breakdown of the first node or the model upgrading during the operation of a network system, it is possible to reliably transmit the IP packet from the second node to the replaced node. Further, even when the IP packet is delivered between the second nodes in the first network, the IP packet can be reliably transmitted. Besides, since the setting information of the address management table is dynamically updated, the operator does not need to manually update the setting information of the address management table whenever the first node is replaced. As a result, the management burden of the operator can be considerably reduced.

In other words, in accordance with the first aspect of the present invention, there can be provided an apparatus for providing connection between networks which can properly manage network information despite replacement of internal nodes without requiring complicated operations of an operator and can perform a highly reliable routing process while reducing management burden.

BRIEF DESCRIPTION OF THE DRAWINGS

The objects and features of the present invention will become apparent from the following description of embodiments, given in conjunction with the accompanying drawings, in which:

FIG. 2 is a block diagram showing a configuration of a L3 switch used in the network system shown in FIG. 1.

FIG. 3 shows an example of a forwarding database used in the L3 switch shown in FIG. 2.

FIG. 4 shows an example of an expansion NAPT table used in the L3 switch shown in FIG. 2.

FIG. 5 shows an example of an expansion NAT table used in the L3 switch shown in FIG. 2.

FIGS. 7A and 7B show a flowchart of a sequence of generating the expansion NAPT table shown in FIG. 4.

DETAILED DESCRIPTION OF THE EMBODIMENTS

Embodiments of the present invention will now be described with reference to the accompanying drawings which form a part hereof.

Figure 1:
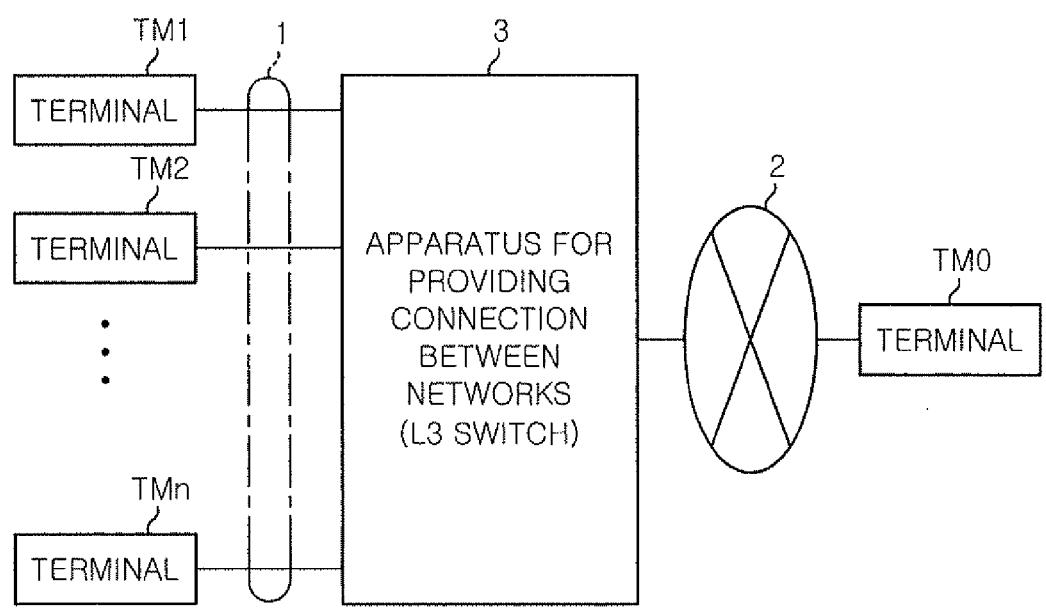
FIG. 1 is a schematic view showing a network system including an apparatus for providing connection between networks in accordance with an embodiment of the present invention.

FIG. 1 schematically shows a network system including an apparatus for providing connection between networks in accordance with an embodiment of the present invention.

The network system includes a LAN (Local Area Network) 1, e.g., Ethernet (Registered Trademark), installed for home or office and a WAN (Wide Area Network) 2 for the Internet, and a L3 (Layer 3) switch 3 serving as an apparatus for providing connection between networks is installed between a LAN 1 and a WAN 2. The L3 switch 3 controls transmission of an IP packet between internal terminals TM1 to TMn connected to the LAN 1 and between the internal terminals TM1 to TMn and an external terminal TM0 connected to the WAN 2.

The internal terminals TM1 to TMn may be, e.g., a network camera, a monitor device and various sensor devices which are included in an image monitoring system; a personal computer, a printer and a fax machine which are included in an OA device group; and a television set, an air conditioner and a cooking device which are included in a home appliance group. Moreover, the external terminal TM0 may be, e.g., a personal computer or a server computer. The LAN 1 may be a wireless LAN without being limited to a wired LAN.

The L3 switch 3 of the present embodiment has a configuration to be described below. FIG. 2 is a block diagram showing the configuration of the L3 switch 3.

The L3 switch 3 includes a physical layer•MAC layer processing block unit (PHY•MAC block unit) 31, an upper layer processing unit 32, an L3 switch unit 33, a NAPT (Network Address Port Translation) processing unit 34, a transmission buffer 35, and a reception buffer 36. The units of the L3 switch 3 are connected to each other through a data bus 37 and a control bus 38.

The PHY•MAC block unit 31 has n+1 number of physical ports PP0 to PPn. The PHY•MAC block unit 31 performs a physical layer process or an MAC layer process specified in the LAN 1 such as Ethernet (Registered Trademark) or the like on the physical ports PP0 to PPn. A pair of control information (information indicating a reception physical port or a transmission physical port) and a MAC frame obtained by the above process are input and output with respect to the data bus 37. The MAC layer process includes, e.g., generation or inspection of a FCS (Frame Check Sequence).

The physical ports PP0 to PPn do not have an IP address or a MAC address. Instead, each of the physical ports PP0 to PPn does not correspond to a virtual port or corresponds to a single virtual port among an arbitrary number (generally, smaller than or equal to n+1) of virtual ports. Each of the virtual ports corresponds to a VLAN (Virtual LAN). An IP address, a net mask and an arbitrary MAC address that are suitable for the network are set for each of the virtual ports.

In the present embodiment, the L3 switch 3 is connected to two networks including the WAN 2 and the LAN 1. Therefore, a virtual port VP0 is set for the WAN 2, and a virtual port VP1 is set for the LAN 1. The physical port PP0 corresponds to the VP0, and the physical ports PP1 to PPn correspond to the VP1. For example, an IP address of the virtual port VP0 is set as (10.1.101.150), and an IP address of the virtual port VP1 is set as (192.168.1.223).

The L3 switch unit 33 has a forwarding•database (FDB) shown in FIG. 3, for example. When receiving an MAC frame from the data bus 37, the L3 switch unit 33 attempts to perform L2 (Layer 2) transmission in accordance with a transmission destination MAC address. The L3 switch unit 33 performs the L3 switch operation when the L2 transmission cannot be carried out.

When the transmission destination IP address of the MAC frame satisfies the condition stored in the FDB, the L3 switch unit 33 overwrites the address read out from the FDB with the transmission destination MAC address. Moreover, the L3 switch unit 33 outputs to the PHY•MAC block unit 31 through the bus 37 the MAC frame and the control information indicating the physical port read out from the FDB.

When the IP address of the transmission source or the transmission destination is a private address, the L3 switch unit 33 does not forward the MAC frame. In the present embodiment, when an IP packet is transmitted between the LAN 1 using a private address and the WAN 2 using a global address, the address conversion is necessary. Hence, the L3 switch unit 33 is hardly operated. In the LAN 1, the conversion between a nominal IP address and an actual IP address is carried out. Accordingly, the L2 switch operation which includes the broadcast transmission is not allowed in the VLAN of the LAN 1.

The NAPT processing unit 34 performs a static NAPT process in order to perform bidirectional IP packet transmission between the LAN 1 using a private address and the WAN 2 using a global address. Generally, a NAPT table stores one-on-one correspondence between pairs of the port numbers and the IP addresses of the terminals TM1 to TMn at the side of the LAN 1 and pairs of the port numbers and the IP addresses at the side of the WAN 2.

However, in the present embodiment, the correspondence relationship between the physical ports and the port numbers is defined by using the pairs of the physical ports and the port numbers in the LAN 1. Moreover, an expansion NAPT table which shows the expanded correspondence relationship is created by using the IP address and the MAC address retrieved by using the physical port numbers as a key. FIG. 4 shows an example of the expansion NAPT table. The generation of the expansion NAPT table will be described later.

The NAPT processing unit 34 performs simultaneous conversion of the IP address, the port number and the MAC address of the MAC frame received from the data bus 37. Further, the NAPT processing unit 34 outputs control information indicating the physical port in accordance with the expansion NAPT table together with the MAC frame to the PHY•MAC block unit 31 through the data bus 37.

The NAPT processing unit 34 also includes a NAT table used for performing a NAT process in the LAN 1. The NAT table will be described later.

The reception buffer 36 receives from the data bus 37 the MAC frame or the like which is not processed by the L3 switch unit 33 or the NAPT processing unit 34 and performs queuing.

The upper layer processing unit 32 performs high level processes such as a routing process, a filtering process, a broadcasting process and the like on the MAC frame read out from the reception buffer 36 and outputs to the reception buffer 35 the MAC frame that has been subjected to the above process. Further, the upper layer processing unit 32 manages the virtual ports VP0 and VP1. Besides, the upper layer processing unit 32 controls the entire operation of the L3 switch 3 by using the virtual ports VP0 and VP1. Specifically, the upper layer processing unit 32 performs communication required for ARP (Address Resolution Protocol)•RARP (Reverse ARP) or DNS, various protocols (ICMP, SNMP, DHCP, telnet, HTTP) for management and setting, IGMP (Internet Group Management Protocol) for multicasting, RSVP (Resource Reservation Protocol) for bandwidth reservation or the like.

For example, when the expansion NAPT table is created, the upper layer processing unit 32 provides to the NAPT processing unit 34 through the control bus 38 information related to the ARP table created for each VLAN by issuing an ARP or learning a MAC frame. When a multicast group is added or deleted by an IGMP, the upper layer processing unit 32 renews the FDB of the L3 switch unit 33 if necessary. When addresses of the virtual ports VP0 and VP1 are not determined, the upper layer processing unit 32 performs IP lease request from a predetermined physical port by the DHCP client function.

The reception buffer 35 receives the MAC frame or the like from the upper layer processing unit 32 and performs queuing. The queued MAC frame is read out when the PHY•MAC block unit 31 is not busy. Furthermore, the reception buffer 36 or the transmission buffer 35 may perform queuing according to QoS (Quality of Service) class based on the various information in a MAC frame header, an IP packet header and a TCP packet header.

Figure 6:
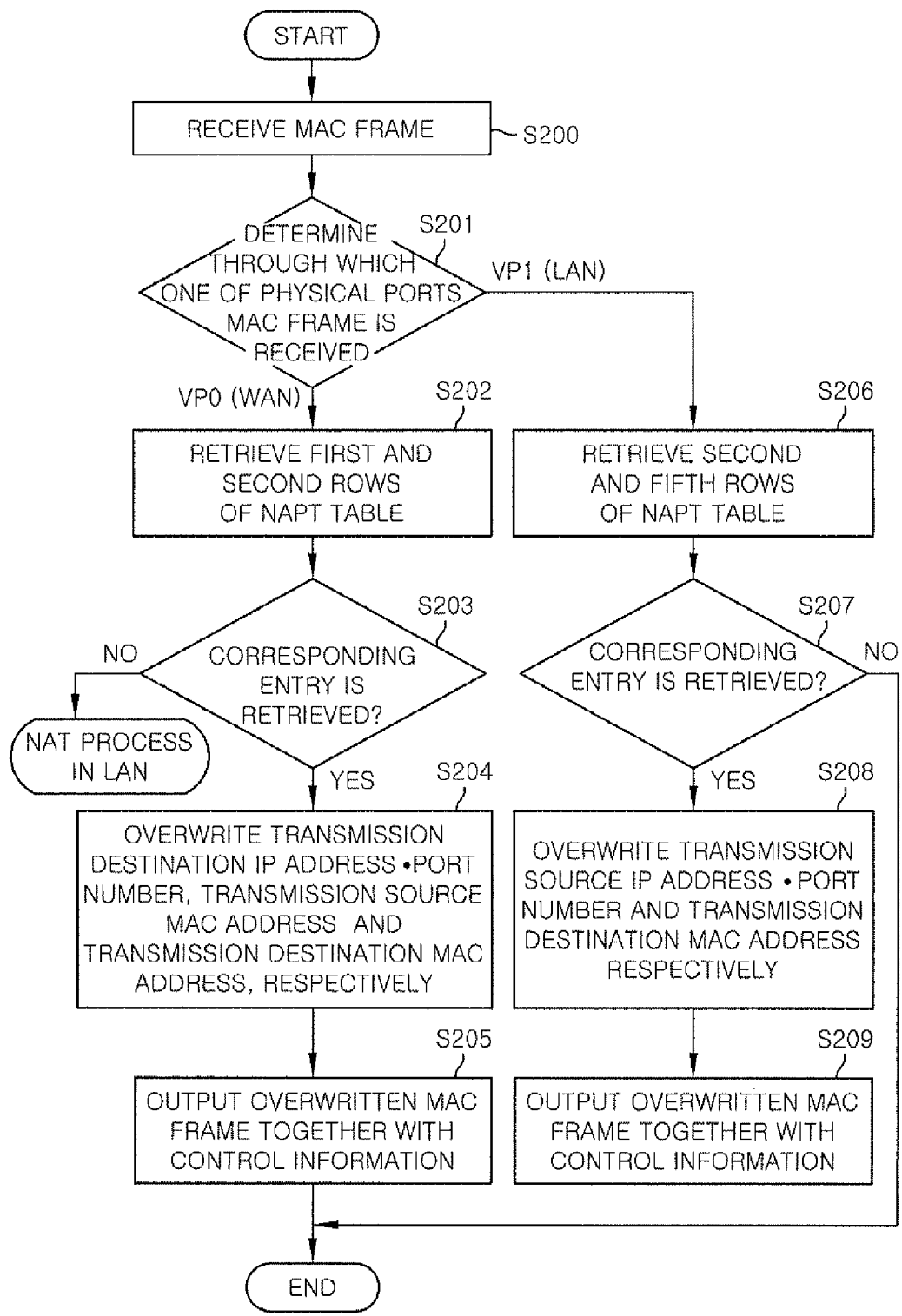
FIG. 6 is a flowchart showing a sequence of a NAPT process performed in accordance with the expansion NAPT table shown in FIG. 4.

Hereinafter, the NAPT process performed by the L3 switch 3 in accordance with the expansion NAPT table shown in FIG. 4 will be described. FIG. 6 is a flowchart showing the processing sequence thereof.

As illustrated in FIG. 4, the expansion NAPT table of the present embodiment stores network information of the WAN 2 in a first to a fourth row thereof and network information of the LAN 1 in a fifth to a seventh row thereof. The correspondence relationship of the network information between the WAN 2 and the LAN 1 is specified for each entry.

In step S200, the NAPT processing unit 34 receives the MAC frame. In step S201, based on the control information received together with the corresponding MAC frame, the NAPT processing unit 34 determines which one of the virtual ports corresponds to the physical port that has transmitted the MAC frame. When the MAC frame is received from the physical port corresponding to the virtual port VP0 (WAN), the process proceeds to step S202. Meanwhile, when the MAC frame is received from the physical port corresponding to the frame virtual port VP1 (LAN), the process proceeds to step S206.

In the step S202, the NAPT processing unit 34 refers to the expansion NAPT table to retrieve an entry in which a transmission destination IP address contained in the IP header and a transmission destination port number contained in the IP payload (TCP header or the like) of the received MAC frame correspond with the data in the first row (IP address: port number (NAPT side)) of the expansion NAPT table; and a transmission source IP address and a transmission source port number correspond with the data in the second row (IP address: port number (WAN machine)) of the expansion NAPT table.

In the case of the entry in which the port number and the IP address of the second row are arbitrary numbers (0.0.0.0 and 0), it is considered that the transmission source IP address and the transmission source port number are respectively identical to the IP address and the port number of the second row. When the entry in which the transmission destination IP address and the transmission destination port number of the IP header correspond with the data in the first row and the transmission source IP address and the transmission source port number correspond with the data in the second row data is retrieved, the process proceeds from the step S203 to step S204. On the contrary, this entry is not retrieved, the process proceeds to the NAT process in the LAN.

In the step S204, the NAPT processing unit 34 overwrites the transmission destination IP address corresponding to the data in the first row of the expansion NAPT table with the data in the fifth row (IP address: port number (machine at the LAN side)) of the expansion NAPT table; the transmission destination MAC address with the MAC address of the seventh row of the same table; and the transmission source MAC address with the MAC address of the virtual port VP0. Thereafter, in step S205, the NAPT processing unit 34 outputs the MAC frame overwritten with the addresses together with control information indicating the physical port in the sixth row of the expansion NAPT table to the data bus 37.

Meanwhile, if it is determined in the step S201 that the MAC frame is received from the LAN 1, the NAPT processing unit 34 accesses the expansion NAPT table and retrieves, in step S206, an entry in which the transmission source IP address and the transmission source port number of the received MAC frame correspond with the data in the fifth row (IP address: port number (machine at the LAN side)) of the expansion NAPT table; and the transmission destination IP address and the transmission destination port number of the received MAC frame correspond with the data in the second row (IP address: port number (machine at the WAN side)) of the expansion NAPT table. As a result, if the entry in which the transmission source IP address and the transmission source port number correspond with the data in the fifth row and the transmission destination IP address and the transmission destination port number correspond with the data in the second row is retrieved in step S207, the process proceeds from the step S207 to step S208. Otherwise, the NAPT process for the corresponding MAC frame is finished.

In the step S208, the NAPT processing unit 34 overwrites the corresponding transmission destination IP address and the corresponding transmission destination port number with the data of the corresponding entry in the first row (IP address: port number (NAPT side)) of the expansion NAPT table, and overwrites the transmission destination MAC address with the MAC address stored in the fourth row of the expansion NAPT table. Next, in step S209, the NAPT processing unit 34 outputs the MAC frame overwritten with the addresses together with the control information indicating the physical port in the third row of the expansion NAPT table into the data bus 37.

Figure 7B:
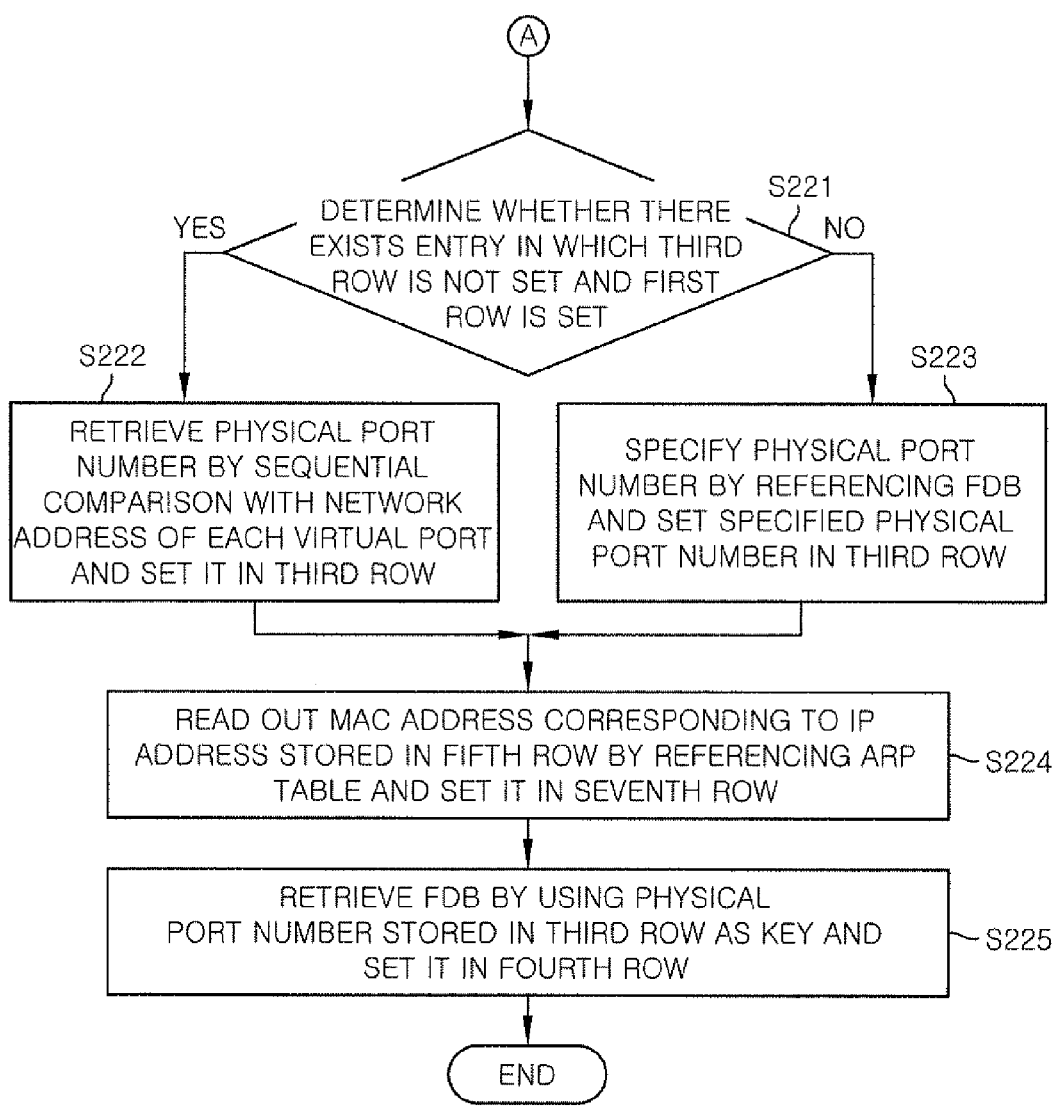

Hereinafter, the process of generating the expansion NAPT table will be described. FIGS. 7A and 7B show a flowchart of the sequence of the above process.

In step S211, the NAPT processing unit 34 receives network information that has been manually input by an operator when the L3 switch 3 is installed, the network information needing to be registered in the expansion NAPT table. At this time, the received network information includes at least the port numbers to be stored in the first and the fifth row of the expansion NAPT table and the physical port numbers to be stored in the third and the sixth row of the expansion NAPT table. Next, in step S212, the NAPT processing unit 34 stores the received port numbers in the first, the third, the fifth and the sixth row of the expansion NAPT table. In step S213, the NAPT processing unit 34 receives the network information that has been manually input by the operator, the network information needing to be registered in the FDB of the L3 switch unit 33. The received network information is stored in the FDB.

Next, in step S214, the NAPT processing unit 34 retrieves, from the MAC table of the L3 switch unit 33, an entry corresponding to the physical port (e.g., PP1) of the sixth row of the expansion NAPT table for an entry where an IP address is set in the fifth row of the expansion NAPT table. Then, in step S215, it is determined whether the MAC address is obtained. As a result, if the MAC address is obtained, the process proceeds from the step S215 to step S216. In the step S216, the NAPT processing unit 34 obtains an IP address from the ARP table of the upper layer processing unit 32 by using the MAC address and sets the corresponding IP address in the fifth row of the expansion NAPT table.

When no entry is retrieved from the MAC table or when the corresponding IP address does not exist in the ARP table, the process proceeds from the step S215 to step S217. In the step S217, the NAPT processing unit 34 retrieves the terminal by using the broadcast (RARP or the like) within the network address of the virtual port VP1 while using the physical port PP1 in the sixth row of the expansion NAPT table as a key.

Thereafter, in step S218, the NAPT processing unit 34 determines whether or not the physical port in the third row corresponds to the virtual port in the entry in which the IP address is not set in the first row of the expansion NAPT table. If it is determined that the physical port in the third row corresponds to the virtual port, the process proceeds to step S219. In the step S219, the NAPT processing unit 34 sets the IP address ((10.1.101.150) in this example) of the corresponding virtual port in the first row of the expansion NAPT table. If the physical port does not correspond to the virtual port, the process proceeds to step S220. In the step S220, the NAPT processing unit 34 specifies a single IP address and a single MAC address by referring to the FDB and sets the specified IP address in the first row of the expansion NAPT table.

In step S221, the NAPT processing unit 34 checks whether there exists an entry in which an IP address is set in the first row of the expansion NAPT table and a physical port number is set in the third row of the expansion NAPT table. If it is determined that such entry exists, the NAPT processing unit 34 retrieves a physical port number by sequential comparison with a network address of each virtual port and sets the retrieved physical port number in the third row of the expansion NAPT table in step S222. On the contrary, if such entry is not retrieved, the NAPT processing unit 34 specifies a physical port number by referencing the FDB and sets the specified physical port number in the third row of the expansion NAPT table in step S223.

Thereafter, in step S224, the NAPT processing unit 34 reads out a MAC address corresponding to the IP address stored in the fifth row of the expansion NAPT table by referencing the ARP table and sets the read MAC address in the seventh row of the expansion NAPT table. In the example of FIG. 4, the MAC address of the interface of the internal terminal (IP address: (192.168.1.90)) at the side of LAN 1 connected to the physical port PP1 is indicated as MA1.

Finally, in step S225, the NAPT processing unit 34 retrieves the FDB by using as a key the physical port number stored in the third row of the expansion NAPT table and sets a transmission destination MAC address (MAC address of a router interface of a next hop router) specified by the FDB in the fourth row of the expansion NAPT table.

Further, the NAPT processing unit 34 may retrieve the virtual port by sequentially comparing the IP address stored in the second row of the expansion NAPT table with the network addresses of the virtual ports or by referencing the transmission destination network address in the FDB, and set the MAC address of the retrieved virtual port (virtual port corresponding to the retrieved physical port) in the fourth row of the expansion NAPT table.

In the example of FIG. 4, a MAC address of an interface at the side of the WAN 2 of a next hop router, i.e., a router connected to a network to which a terminal having a physical port PP0 of the WAN 2 and an IP address stored in the second row of the expansion NAPT table belongs, is indicated as MAg.

Figure 8:
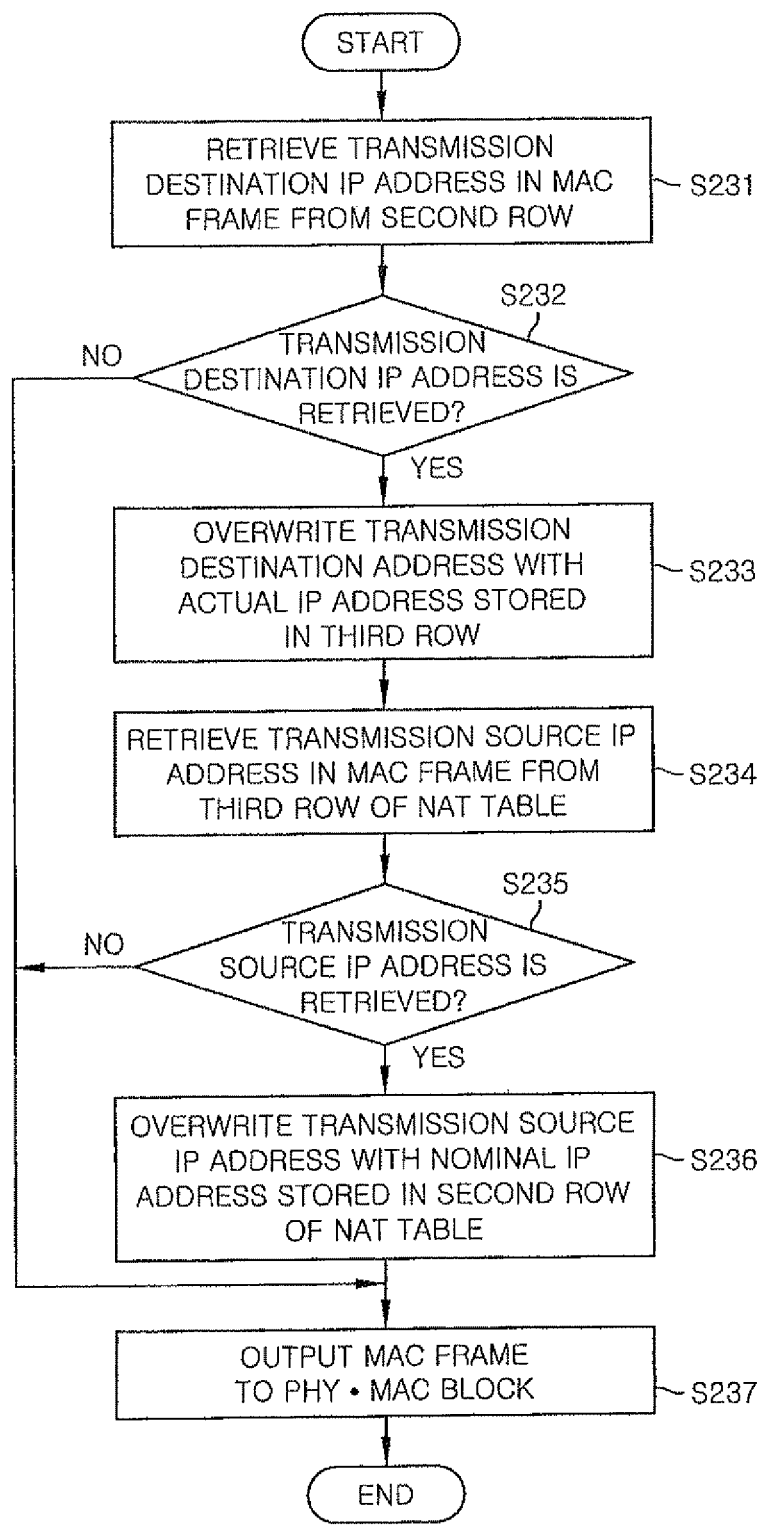
FIG. 8 is a flowchart showing a sequence of an NAT process performed in a LAN in accordance with the NAT table shown in FIG. 5.

Hereinafter, the NAT process performed in the LAN in accordance with the NAT table shown in FIG. 5 will be described. FIG. 8 is a flowchart showing the sequence of the NAT process. Further, it is not necessary to perform the NAT process in the LAN.

When the L3 switch 3 is installed, the first row (physical port) and the second row (nominal IP address of the terminal) of the NAT table of the present embodiment are set by the operator. Each entry (except the entry in the final line) specifies that a single terminal is connected to a physical port and a nominal IP address of the terminal is an IP address stored in the second row.

When the MAC frame received from the virtual port VP1 is not a target frame to be subjected to the NAPT process, the NAPT processing unit 34 retrieves, in step S231, a transmission destination IP address in the MAC frame from the second row of the NAT table (except the entry in the final line). Then, in step S232, it is determined whether the transmission destination IP address is retrieved. If the transmission destination IP address is retrieved, the process proceeds from the step S232 to step S233. In the step S233, The NAPT processing unit 34 overwrites the transmission destination address in the MAC frame with the actual IP address stored in the third row of the NAT table.

Thereafter, in step S234, the NAPT processing unit 34 retrieves a transmission source IP address in the received MAC frame from the third row of the NAT table. Then, in step S235, it is determined whether the transmission source IP address is retrieved. If the transmission source IP address is retrieved, the process proceeds from the step S235 to step S236. In the step S236, the NAPT processing unit 34 overwrites the transmission source IP address in the MAC frame with the nominal IP address stored in the second row of the NAT table.

Next, in step S247, the NAPT processing unit 34 outputs the MAC frame to the PHY•MAC block. When the transmission destination IP address is overwritten, control information transmitted from the physical port in the first row of the entry which is used for overwriting the corresponding IP address is added to the MAC frame. Meanwhile, when the transmission destination IP address is not overwritten, the control information transmitted from the physical port (indicated as PPx) in the final line entry of the NAT table is added to the MAC frame.

Although the physical port PPx belongs to the VLAN of the virtual port VP1 for use in LAN, one or more terminals can be connected thereto. If the physical port PPx is specified, the final line entry shown in FIG. 5 is unnecessary. The terminal that can be connected to the physical port PPx does not use a nominal IP address. In other words, in such terminal, the actual IP address and the nominal IP address are the same.

Finally, the broadcast process performed by the upper layer processing unit 32 will be described.

In the L3 switch 3 of the present embodiment, the aforementioned nominal IP address is used for the physical ports PP1 to PP7, so that messages of various protocols (ARP, ICMP, DHCP) using the broadcast cannot be transmitted to the physical ports. Therefore, it is required to interpret the message and perform the NAT process for the IP address contained in the message. Hence, the address conversion using the NAT table shown in FIG. 5 is carried out by the software process of the upper layer processing unit 32.

In the case of using the L3 switch 3, even if IP addresses are randomly set for the internal terminals TM1 to TM7 connected to the physical ports PP1 to PP7 at the side of the LAN 1, the internal terminals TM1 to TM7 at the side of the LAN 1 can communicate with a desired object by using the specified nominal IP address as long as the operator specifies the correspondence between the physical ports PPA to PP7 and the nominal IP addresses.

In the network system provided with the L3 switch 3 having the above-described configuration and function, the following routing process is carried out.

Figure 9:
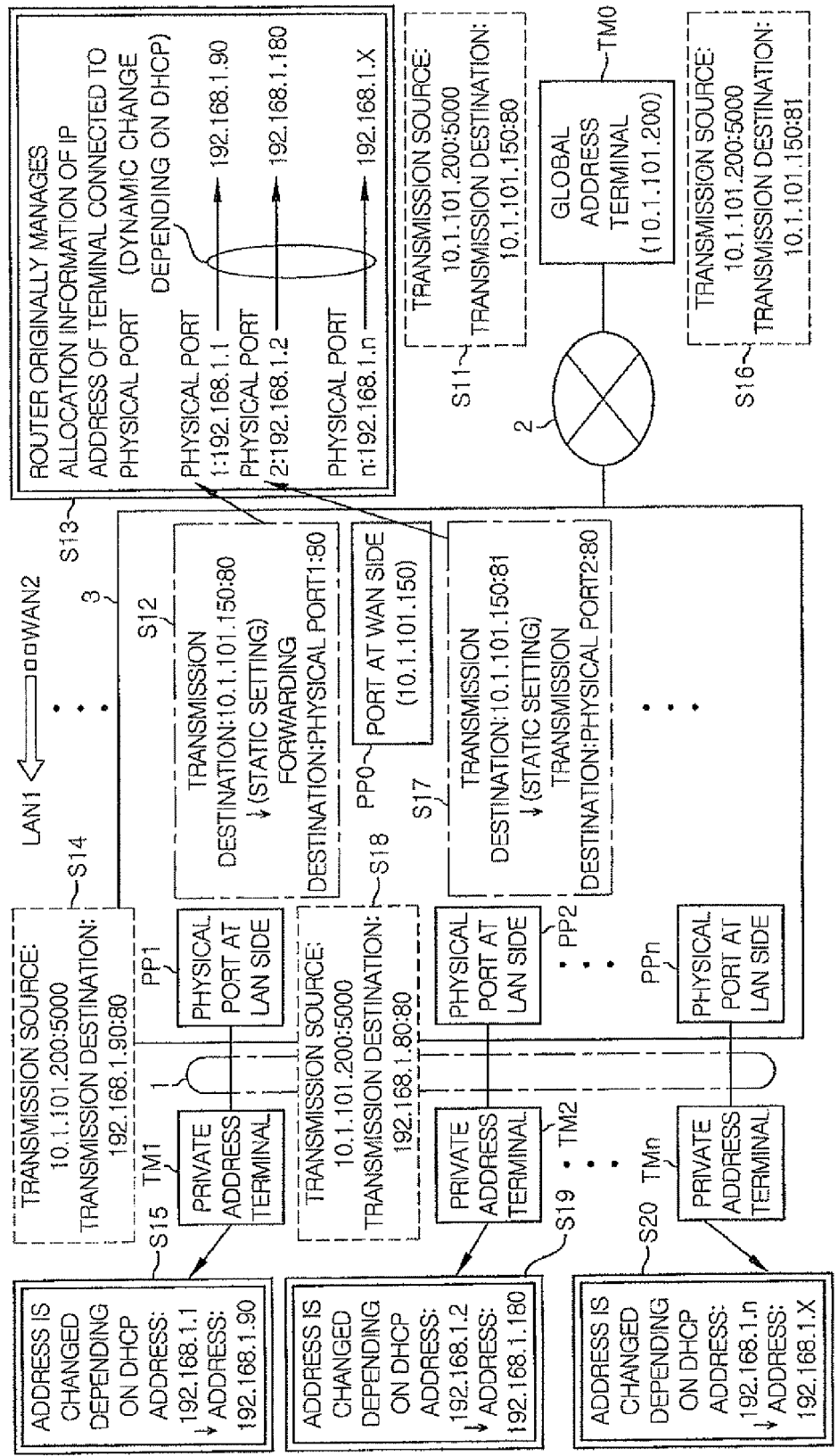
FIG. 9 explains a routing process between a WAN and a LAN which is performed by the L3 switch shown in FIG. 2.

First, a routing process between a WAN and a LAN will be explained. FIG. 9 explains the sequence of the routing process.

For example, when the external terminal TM0 accesses the internal terminal TM1, the external terminal TM0 generates, in step S11, an IP packet in which the global address (10.1.101.200) and the port number 5000 allocated to the external terminal are set as the transmission source IP address; and the global address (10.1.101.150) and the port number 80 allocated to the WAN port PP0 of the L3 switch 3 are set as the transmission destination address. Moreover, the external terminal TM0 transmits the IP packet to the L3 switch 3 through the WAN 2.

In the L3 switch 3, the NAPT processing unit 34 has the expansion NAPT table. When the IP packet is received from the external terminal TM0, the L3 switch 3 retrieves the expansion NAPT table by using as a key the transmission destination port number 80 of the received IP packet and reads out the physical port number PP1 corresponding to the transmission destination port number in step S12.

In step S13, the L3 switch 3 reads out the private address (192.168.1.90) and the port number 80 corresponding to the read physical port number PP1 from the expansion NAPT table. The L3 switch 3 overwrites the transmission destination address of the received IF packet with the private address (192.168.1.90) and the port number 80. In step S14, the IP packet overwritten with the transmission destination address is transmitted from the physical port PP1 to the internal terminal TM1 through the LAN 1.

When the external terminal TM0 transmits an IP packet to one of the other internal terminals TM2 to TMn as well as when the external terminal TM0 transmits an IP packet to the internal terminal TM1, the L3 switch 3 performs a routing process in accordance with the expansion NAPT table.

For example, in step S16, an IF packet in which a global address (10.1.101.150) and a port number 81 are set as the transmission destination address is transmitted from the external terminal TM0. Accordingly, in step S17, the L3 switch 3 retrieves the physical port number PP2 from the expansion NAPT table by using as a key the transmission destination port number 81 of the received IF packet. In step S13, the L3 switch 3 retrieves the private address (192.168.1.180) and the port number 80 allocated to the internal terminal by using the physical port number PP2 as a key. Further, the transmission destination address of the received IP packet is overwritten with the private address (192.168.1.180) and the port number 80. Then, in step S18, the IP packet overwritten with the transmission destination address is transmitted from the physical port PP2 to the internal terminal TM2 through the LAN 1.

As such, even if one of the internal terminals TM1 to TMn is replaced with another terminal due to the breakdown or the model upgrading and the DHCP function allocates a new private address for the terminal after the replacement as described in steps S15, S19 and S20, the IP packet from the external terminal TM0 can be transmitted in a state where its transmission destination address is converted to the private address after the replacement.

Figure 10:
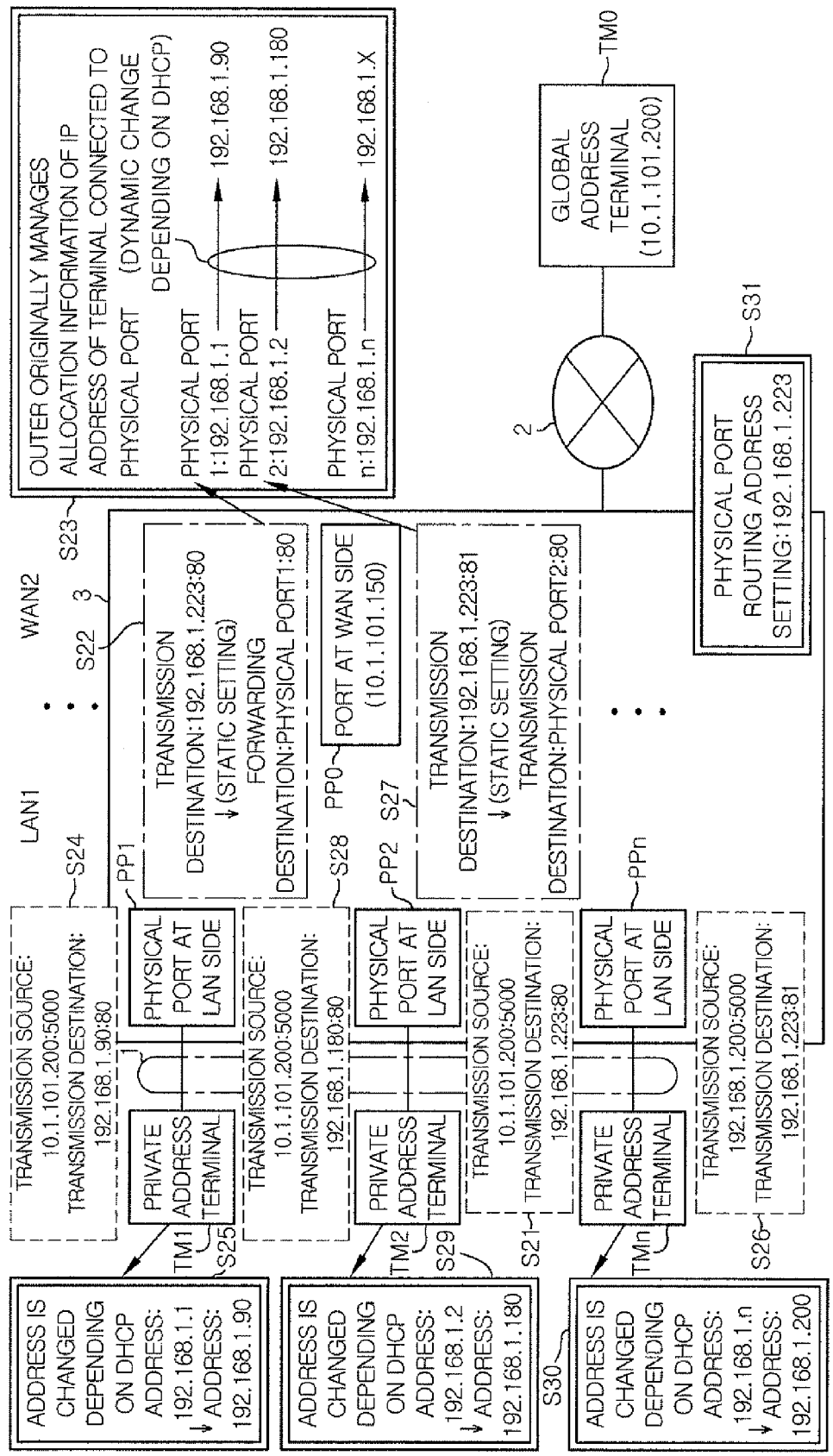
FIG. 10 explains the routing process between the LAN and the WAN which is performed by the L3 switch shown in FIG. 2.

Next, a routing process between a LAN and a LAN is performed as follows. FIG. 10 explains the sequence of the routing process.

When the L3 switch 3 is installed, the operator sets a physical port routing address of a LAN side as one of private addresses in the expansion NAPT table. However, even when network information such as an IP address, a subnet mask and the like are dynamically allocated to the internal terminals TM1 to TMn at the side of the LAN 1 by the DHCP function of the L3 switch 3, the physical port routing address should not be included in the DHCP address allocation target. For example, an IP address (192.168.1.223) is set for the physical port routing address as shown in FIG. 10.

For example, when the internal terminal TMn transmits the IP packet to the internal terminal TM1 connected to the same LAN, the internal terminal TMn generates, in step S21, an IP packet in which the physical port routing address (192.168.1.223) and the transmission destination port number 80 are set as the transmission destination address; and the private address (192.168.1.200) of the internal terminal TMn and the transmission source port number 5000 are set as the transmission source address. The internal terminal TMn transmits the generated IP packet to the L3 switch 3.

When the IP packet is received from the internal terminal TMn, the L3 switch 3 reads out the transmission destination port number 80 from the received IP packet and reads out the physical port number PP1 of the transmission destination from the expansion NAPT table by using the transmission destination port number 80 as a key in step S22. Next, in step S23, the L3 switch 3 reads out an IP address (192.168.1.90) of a transmission destination terminal which is set in association with the physical port number PP1 from the expansion NAPT table, and overwrites the IP address (192.168.1.90) and the transmission destination port number 80 with the transmission destination address of the IP packet. In step S24, the L3 switch 3 transmits the IF packet in which its transmission destination address has been overwritten from the physical port PP1 to the internal terminal TM1 of the transmission destination through the LAN 1.

In the same manner, when the internal terminal TMn transmits an IP packet to the internal terminal TM2 connected to the same LAN 1, the internal terminal TMn generates, in step S26, an IP packet in which the transmission destination port number 81 and the physical port routing address (192.168.1.223) are set as the transmission destination address; and the transmission source port number 5000 and the private address (192.168.1.200) of the terminal are set as the transmission source address. Next, the generated IP packet is transmitted to the L3 switch 3.

In step S27, the L3 switch 3 reads out the physical port number PP1 of the transmission destination from the expansion NAPT table by using as a key the transmission destination port number 81 set in the received IP packet. As in the case of transmitting the IP packet to the internal terminal TM1, the L3 switch 3 reads out the IP address (192.168.1.180) of the transmission destination terminal TM1 which is set in association with the physical port number PP1 from the expansion NAPT table and overwrites the transmission destination of the IP packet with the IP address (192.168.1.180) and the transmission destination port number 80 in the step S23. In step S28, the L3 switch transmits the IP packet in which its transmission destination address has been changed from the physical port PP2 to the internal terminal TM2 of the transmission destination through the LAN 1.

As such, even if one of the internal terminals TM1 to TMn connected to the LAN 1 is replaced with another terminal due to the breakdown or the model upgrading and the DHCP function allocates a new private address for the terminal after the replacement as described in the steps S25 to S30, the IP packet can be reliably transmitted between the internal terminals TM1 to TMn in the LAN 1.

As described above, in the present embodiment, even if one of the internal terminals TM1 to TMn is replaced with another terminal due to the breakdown or the model upgrading and the DHCP function allocates a new private address for the MAC address after the replacement, the newly allocated private address is managed in association with the physical ports PP1 to PPn in the expansion NAPT table. Then, in this state, when the IP packet is delivered from the external terminal TM0 at the side of the WAN 2, the transmission destination address information of the IP packet is converted to the private address of the internal terminal after conversion in accordance with the expansion NAPT table using the physical ports as a key.

Hence, even if one of the internal terminals TM1 to TMn is replaced with another terminal due to the breakdown during the operation of the system or the model upgrading, it is possible to reliably transmit the IP packet from the external terminal TM0 to one of the internal terminals TM1 to TMn after the replacement. Moreover, the setting information of the expansion NAPT table and that of the NAT table are dynamically renewed by using the physical ports as a key, so that the operator does not need to manually renew the setting information of the NAPT table and that of the NAT table whenever the internal terminals TM1 to TMn are replaced. Accordingly, it is possible to reduce the management burden.

The present invention is not limited to the above-described embodiment. For example, in the above-described embodiment, the L3 switch 3 is used as the apparatus for providing connection between networks. However, an edge router may be used.

Figure 11:
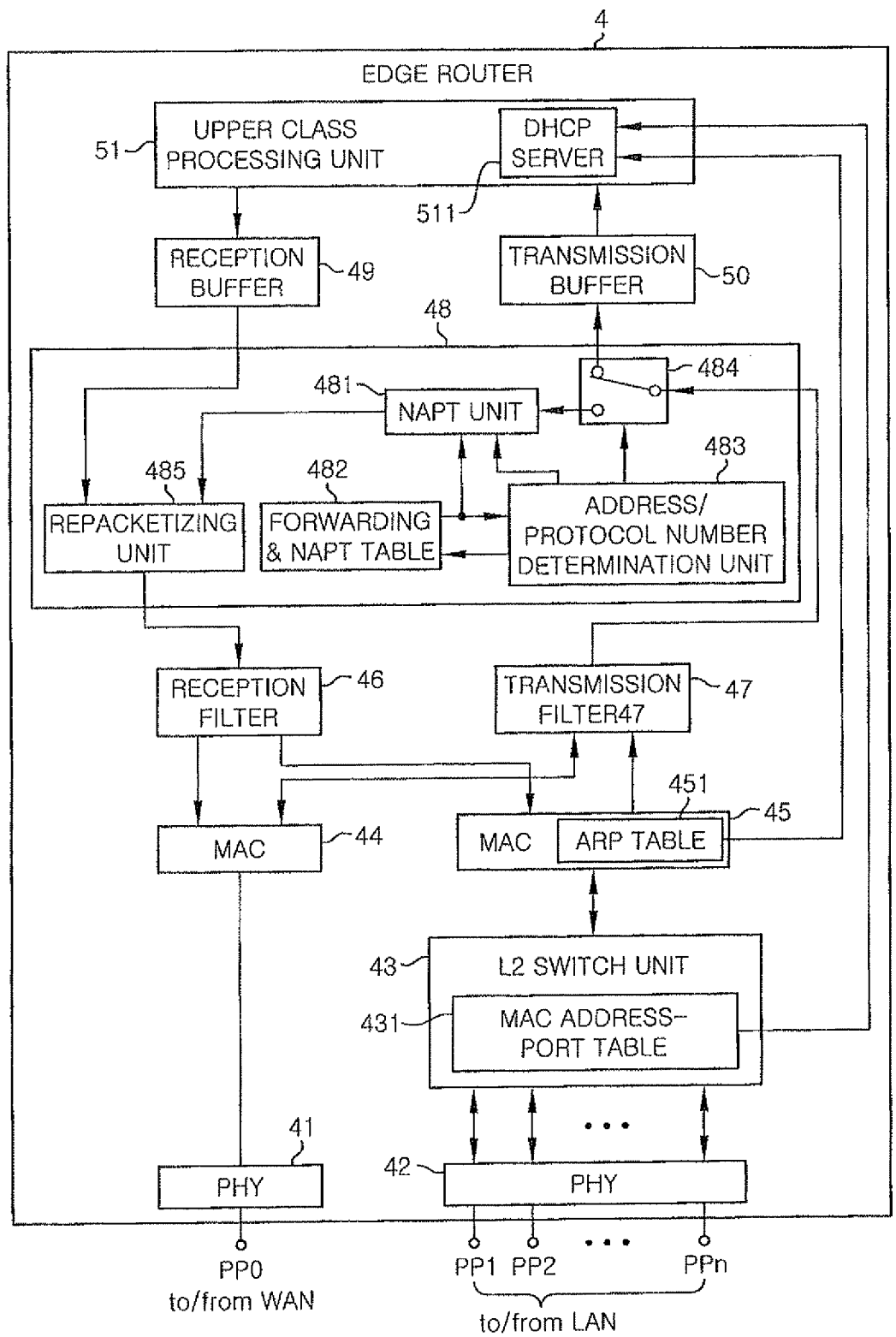
FIG. 11 is a block diagram showing a configuration of an edge router serving as an apparatus for providing connection between networks in accordance with another embodiment of the present invention.
Figure 12:
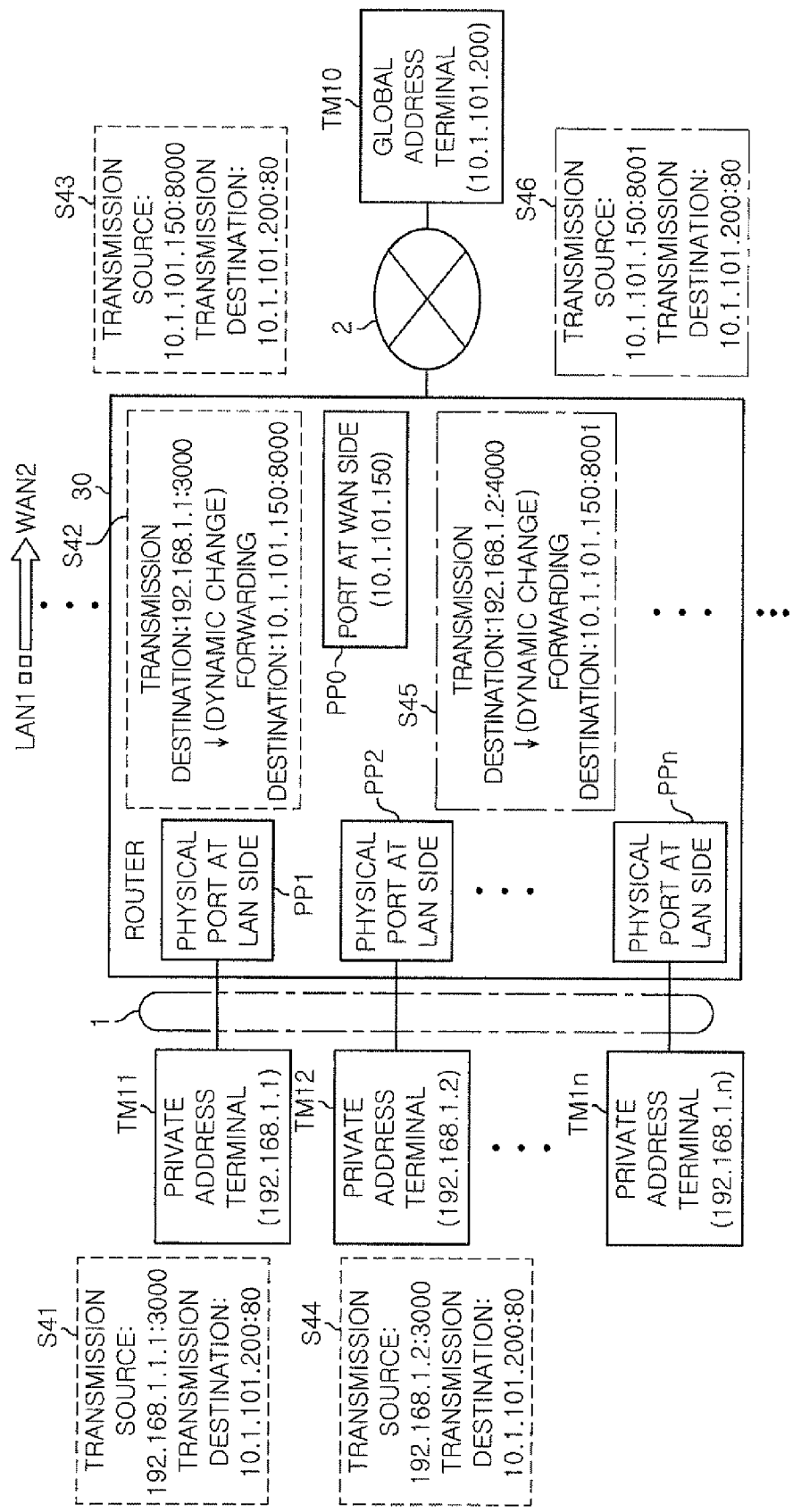
FIG. 12 explains a basic routing process of a router in the case of transmitting an IP packet from an LAN node to a WAN node.
Figure 13:
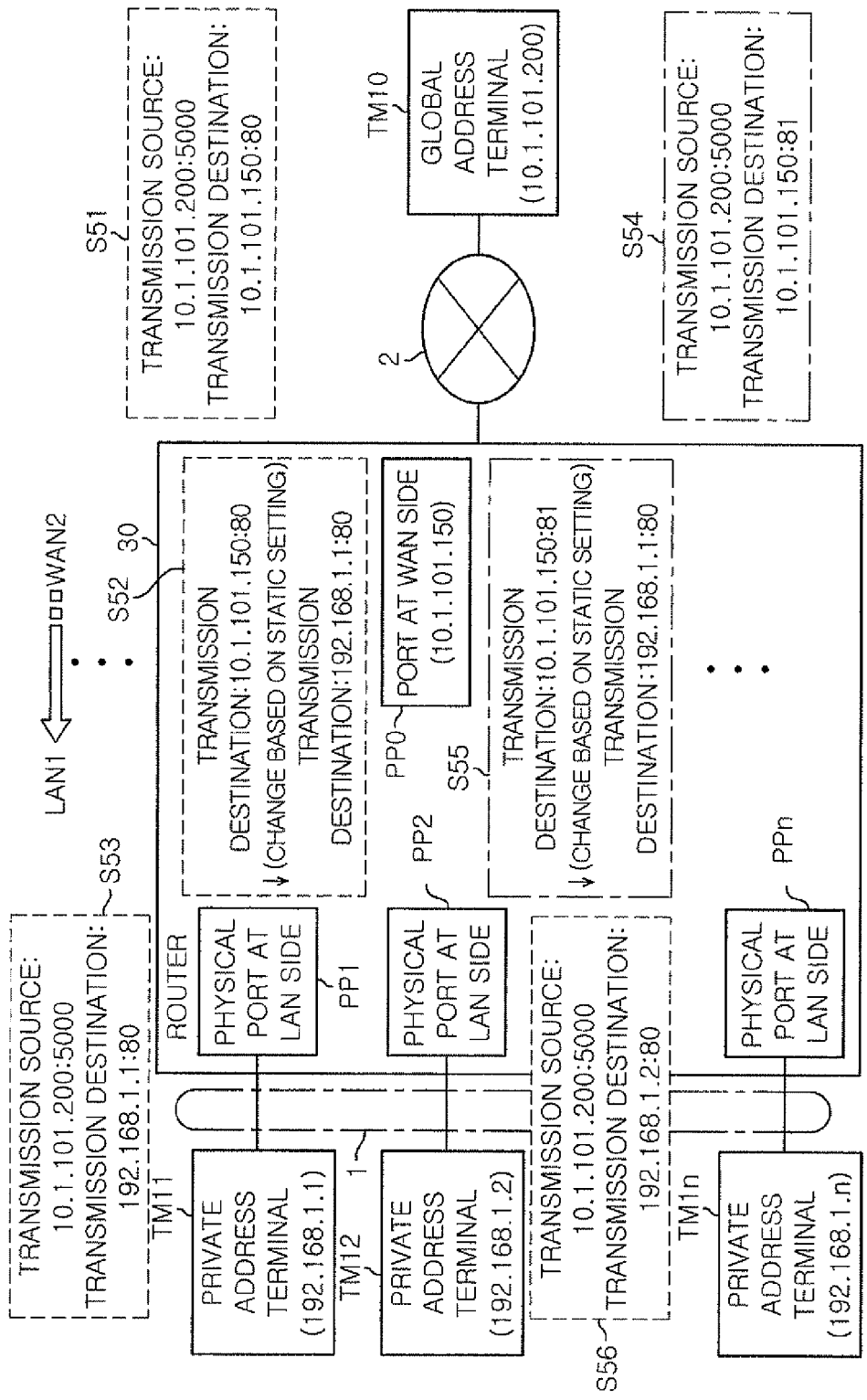
FIG. 13 explains a basic routing process of a router in the case of transmitting an IP packet from a WAN node to a LAN node.
Figure 14:
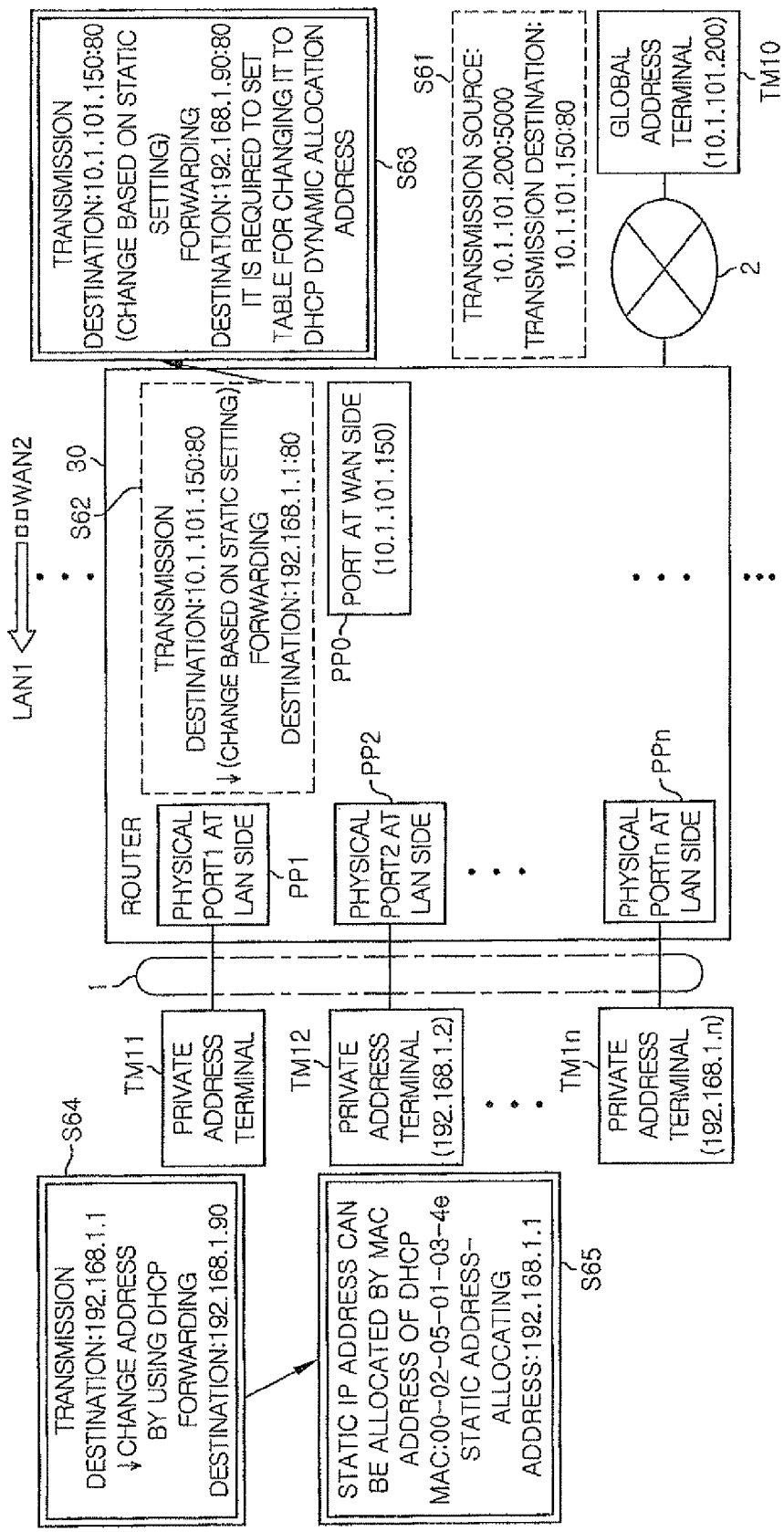
FIG. 14 explains an operation of a router having a function of static IP address allocation by a DHCP using a MAC address.

FIG. 11 is a block diagram showing a configuration of an edge router serving as an apparatus for providing connection between networks in accordance with another embodiment of the present invention. The edge router 4 includes a WAN physical port block unit 41, a LAN physical port block unit 42, a L2 switch unit 43, a WAN MAC processing unit 44, and a LAN MAC processing unit 45 having an ARP table 451. The WAN physical port block unit 41 is connected to a single physical port PP0. The LAN physical port block unit 42 is connected to a plurality of physical ports PP1 to PPn.

The L2 switch unit 43 creates a MAC address-physical port table (hereinafter, referred to as a MAC table) 431 by learning a transmission source MAC address and constantly renews the contents. The MAC table 431 shows the connection relationship between the MAC address and the physical port.

Further, the edge router 4 includes a reception filter 46, a transmission filter 47, an IP forwarding•NAPT unit 48, a reception buffer 49, a transmission buffer 50, and an upper layer processing unit 51.

Especially, the IP forwarding•NAPT unit 48 has a NAPT unit 481, a forwarding•NAPT table 482, an address/protocol number determination unit 483, a conversion unit 484, a repacketizing unit 485. The NAPT unit 48 performs the NAPT process such as IP address conversion or the like based on network information stored in the forwarding•NAPT table 482 and the determination result of the address/protocol number determination unit 483. The repacketizing unit 485 obtains a reception IP packet from the reception buffer 49 and repacketizes the reception packet based on the processing result of the NAPT unit 481.

The upper layer processing unit 51 includes a DHCP server 511 and an allocation table (not shown) which has a client function and correlates a plurality of IP addresses to be allocated with physical ports. When an IP lease request is received from the internal terminal connected to one of the physical ports PP1 to PPn, the upper layer processing unit 51 reads out the transmission source MAC address corresponding to the request and refers to the MAC table 430 of the L2 switch 43 to specify the physical port connected to the request source terminal. The upper layer processing unit 51 reads out the IP address corresponding to the specified physical port from the allocation table and performs a predetermined process such as a process for providing IP lease or the like by using the read IP address.

In other words, the edge router 4 of the present embodiment is a modified edge router having a DHCP function, and is different from a conventional edge router in that the DHCP 511 of the upper layer processing unit 51 allocates specific IP addresses to the physical ports PP0 to PPn. The functions of the L3 switch may be respectively realized by separate components.

The type or configuration of the apparatus for providing connection between networks, the sequence and contents of the NAPT process and the NAT process, the configuration of the expansion NAPT table and the NAT table and the like may be variously modified without departing from the scope of the present invention.

For example, the present invention is not limited to the above embodiments, and may be embodied in the execution stage by modifying constituent elements within the scope of the invention. Further, various inventions may be formed by proper combinations of a plurality of constituent elements disclosed in the above embodiments. For example, several constituent elements may be omitted from the all the constituent elements disclosed in the above elements. Furthermore, constituent elements in the different embodiments may be properly combined.

What is claimed is:

1. An apparatus for providing connection between networks which transmits IP packets between a first network to which a plurality of first nodes are connected and a second network to which a second node is connected by using private addresses and first port numbers allocated to the first nodes and a global address allocated to the second node, the apparatus comprising:
    an address management table storing entries presenting correspondence relationships between pairs of the private addresses and the first port numbers allocated to the first nodes, virtual port numbers used with a first global address allocated to a WAN (wide area network) port of the apparatus, and physical port numbers of physical ports of the apparatus, each of the first nodes being solely connected to one of the physical ports;
    a reception unit configured to receive the IP packets transmitted from the first or the second node;
    a first retrieval unit configured to retrieve, when the reception unit receives a first IP packet transmitted from the second node, the first IP packet having a first destination global address and a first destination port number as transmission destination address information, an entry having a virtual port number identical to the first destination port number from the address management table based on the first destination port number of the first IP packet;
    a second retrieval unit configured to retrieve, from the address management table, a private address and a first port number allocated to a first node connected to a physical port of which a physical port number is included in the entry retrieved by the first retrieval unit;
    an overwrite unit configured to overwrite the first destination global address and the first destination port number of the first IP packet received by the reception unit with the retrieved private address and the first port number; and
    a transmission unit for transmitting the first IP packet overwritten with the retrieved private address and the first port number to the first node through the first network.

2. The apparatus of claim 1, wherein the apparatus further comprises:
    an address translation table storing one-to-one correspondence relationships between nominal IP addresses, the physical port numbers and the private addresses;
    a third retrieval unit configured to retrieves, when the reception unit receives, from one of the first nodes, a second IP packet having a nominal IP address as a destination IP address and a private address of said one of the first nodes as a source IP address, a physical port number connected to a destination node within the first network and a private address allocated to the destination node from the address translation table based on the nominal IP address of the second IP packet; and
    a fourth retrieval unit configured to retrieve a nominal IP address of said one of the first nodes from the address translation table based on the source IP address,
    wherein the overwrite unit is configured to overwrite the destination IP address and the source IP address of the second IP packet with the private address retrieved by the third retrieval unit and the nominal IP address retrieved by the fourth retrieval unit; and,
    wherein the transmission unit is configured to transmit the overwritten second IP packet to the destination node through the physical port number retrieved by the third retrieval unit.

3. The apparatus of claim 1, further comprising an updating unit configured to dynamically update correspondence relationships between virtual port numbers and the pairs of the private addresses and the first port numbers stored in the address management table by using the physical port numbers as keys when the private addresses are changed.

4. The apparatus of claim 1, wherein the first network is a local area network (LAN), and the second network is a wide area network (WAN).

5. The apparatus of claim 1, wherein when the reception unit receives from the first node a third IP packet including a third source IP address, a third source port number and a third destination port number, the overwrite unit overwrites the third source IP address and the third source port number of the third IP packet with the first global address and a virtual port number retrieved based on a physical port number corresponding to the third source port number.

6. A network system comprising:
    the apparatus and the plurality of first nodes set forth in in claim 1, each of which is solely connected to one of the physical ports of the apparatus.

* * * * *